US010508376B2

United States Patent
Mamiya

(10) Patent No.: US 10,508,376 B2
(45) Date of Patent: Dec. 17, 2019

(54) WASHING MACHINE

(71) Applicants: HAIER ASIA CO., LTD., Tokyo (JP); QINGDAO HAIER WASHING MACHINE CO., LTD., Shandong (CN)

(72) Inventor: Haruo Mamiya, Tokyo (JP)

(73) Assignee: Haier Asia Co., Ltd., Shandong (CN)

( * ) Notice: Subject to any disclaimer, the term of this patent is extended or adjusted under 35 U.S.C. 154(b) by 153 days.

(21) Appl. No.: 15/539,106

(22) PCT Filed: Dec. 18, 2015

(86) PCT No.: PCT/CN2015/097814
§ 371 (c)(1),
(2) Date: Jul. 26, 2017

(87) PCT Pub. No.: WO2016/101841
PCT Pub. Date: Jun. 30, 2016

(65) Prior Publication Data
US 2017/0362759 A1   Dec. 21, 2017

(30) Foreign Application Priority Data
Dec. 26, 2014   (JP) .................................. 2014-265529

(51) Int. Cl.
*D06F 33/02* (2006.01)
*D06F 41/00* (2006.01)
(Continued)

(52) U.S. Cl.
CPC ............ *D06F 33/02* (2013.01); *D06F 35/006* (2013.01); *D06F 37/30* (2013.01); *D06F 41/00* (2013.01); *Y02B 40/56* (2013.01)

(58) Field of Classification Search
CPC ........ D06F 33/02; D06F 37/30; D06F 55/006; D06F 41/00; Y02B 40/56
See application file for complete search history.

(56) References Cited

U.S. PATENT DOCUMENTS

2003/0046962 A1*  3/2003  Sonoda ................. D06F 37/225
                                              68/12.06
2004/0154642 A1*  8/2004  Kim ...................... D06F 35/006
                                              134/18
(Continued)

FOREIGN PATENT DOCUMENTS

| CN | 1244606 A | 2/2000 |
| CN | 1944770 A | 4/2007 |

(Continued)

OTHER PUBLICATIONS

Machine Translation of JPH015484 to Murakami et al., Jan. 1998. (Year: 1998).*

(Continued)

*Primary Examiner* — Benjamin L Osterhout
(74) *Attorney, Agent, or Firm* — David B. Tingey; Bryant J. Keller; Kirton McConkie

(57) ABSTRACT

A washing machine is provided. The washing machine includes: a washing/dewatering drum for accommodating the washings; an electric motor for driving the washing/dewatering drum to rotate; and a microcomputer. In a rinsing process of a washing operation in a water saving mode, the microcomputer continuously performs a dewatering-rinsing process for a plurality of times rather than executing a water-storage rinsing process for rotating a rotating wing while water stored in the washing/dewatering drum reaches a specified water level. The dewatering-rinsing process includes: a water supplying process of supplying water to the washing/dewatering drum so that the washings are saturated by water, and an intermediate dewatering process or a final dewatering process executed immediately after the water supplying process. A maximum rotating speed of the motor in the intermediate dewatering process immediately (Continued)

before the water supplying process is lower than a maximum rotating speed in the final dewatering process.

10 Claims, 7 Drawing Sheets

(51) Int. Cl.
    *D06F 37/30*     (2006.01)
    *D06F 35/00*     (2006.01)

(56) References Cited

U.S. PATENT DOCUMENTS

| | | | |
|---|---|---|---|
| 2004/0158933 A1* | 8/2004 | Seo | D06F 35/006 |
| | | | 8/137 |
| 2005/0091760 A1* | 5/2005 | Do | D06F 33/02 |
| | | | 8/159 |
| 2006/0005581 A1* | 1/2006 | Banba | D06F 35/00 |
| | | | 68/5 R |
| 2006/0010613 A1* | 1/2006 | Jeon | D06F 35/006 |
| | | | 8/158 |
| 2006/0053842 A1* | 3/2006 | Je | D06F 39/02 |
| | | | 68/17 R |
| 2006/0195989 A1* | 9/2006 | Jeong | D06F 25/00 |
| | | | 8/158 |
| 2007/0056328 A1* | 3/2007 | Song | D06F 39/02 |
| | | | 68/17 R |
| 2011/0056029 A1 | 3/2011 | Bae et al. | |

FOREIGN PATENT DOCUMENTS

| | | |
|---|---|---|
| CN | 102762789 A | 10/2012 |
| EP | 1772548 A1 | 4/2007 |
| EP | 2692930 A1 | 2/2014 |
| JP | 105484 A | 1/1998 |
| JP | 2000014961 A | 1/2000 |
| JP | 2003522568 A | 7/2003 |
| JP | 2011015714 A | 1/2011 |
| JP | 2013515557 A | 5/2013 |
| KR | 20060007248 A | 1/2006 |
| KR | 20070038733 A | 4/2007 |
| KR | 20110072974 A | 6/2011 |
| WO | 01/59196 A1 | 8/2001 |

OTHER PUBLICATIONS

International Search Report dated Mar. 23, 2016 from International Patent Application No. PCT/CN2015/097814 filed Dec. 18, 2015.

* cited by examiner

WASHING MACHINE

TECHNICAL FIELD

The present disclosure discloses a washing machine.

BACKGROUND

In a washing operation of a washing machine recorded in patent literature 1 described below, a washing process, a rinsing process and a dewatering process are performed in sequence. Dewatering is performed at the end of the washing process. A dewatering-rinsing process, which is also referred to as splashing rinsing, is performed during the rinsing process. During the dewatering-rinsing process, water is injected into a washing drum (which also used as a dewatering drum) of the washing machine so that all the washings are saturated by water, and then, after stopping injecting water, the washing/dewatering drum is driven to rotate at a high speed so as to dewater the washings with centrifugal force. Thus, detergent water and water permeating into the washings can be thrown out and removed.

During the dewatering-rinsing process, compared with a water-storage rinsing in which the washings are rinsed while water stored in the washing/dewatering drum reaches a specified water level, and a water-injection rinsing process in which the washings are stirred while water is injected into the washing/dewatering drum, since the water is only injected to make all the washings are saturated, a water supplying quantity required for rinsing in one washing operation can be reduced. Therefore, water can be greatly saved with the procedure of dewatering and rinsing.

RELATED TECHNICAL LITERATURE

Patent Literature

Patent Literature 1: Japanese Patent application Laid-Open No. 3332732

Problems to be Solved by the Disclosure

In patent literature 1, when the rotating speed of the washing/dewatering drum is high in the dewatering at the end of the washing process, the washings attach to an inner surface of the washing/dewatering drum due to the centrifugal force and become compacted. Accordingly, the washings are hard to be saturated by water in the later rinsing process. This is the reason why it is difficult to improve rinsing a performance of the washings.

SUMMARY

In view of the above, the present disclosure is made. The present disclosure aims to provide a washing machine capable of improving a rinsing performance of washings while achieving water saving.

Solutions to the Problem

A washing machine provided by the present disclosure includes: a washing/dewatering drum, configured to accommodate washings and capable of rotating; an electric motor for driving the washing/dewatering drum to rotate; and an execution unit, configured to supply water to the washing/dewatering drum, execute drainage of the washing/dewatering drum, or control rotation of the electric motor to drive the washing/dewatering drum to rotate, and execute a washing operation consisting of a washing process, a rinsing process after the washing process and a dewatering process. The dewatering process includes a final dewatering process and an intermediate dewatering process, where the final dewatering process is executed at the end of the washing operation, and the intermediate dewatering process is at least executed immediately after the washing process. In the rinsing process of the washing operation in a water saving mode, the execution unit is configured to continuously execute a dewatering-rinsing process for a plurality of times rather than executing a water-storage rinsing process for rinsing the washings while water stored in the washing/dewatering drum reaches a specified water level. The dewatering-rinsing process includes: a water supplying process of supplying water to the washing/dewatering drum so that the washings are saturated by water, and the intermediate dewatering process or the final dewatering process executed immediately after the water supplying process. A maximum rotating speed of the electric motor in the intermediate dewatering process immediately before the water supplying process is lower than a maximum rotating speed of the electric motor in the final dewatering process.

Moreover, in the present disclosure, the execution unit is configured to drive the washing/dewatering drum to rotate in the water supplying process, and the rotating speed of the electric motor in the water supplying process is lower than a minimum rotating speed at which the washing/dewatering drum resonates.

Moreover, in the present disclosure, the execution unit is configured to intermittently rotate the washing/dewatering drum in the water supplying process.

Moreover, in the present disclosure, the execution unit is configured to intermittently supply water to the washing/dewatering drum in the water supplying process.

Moreover, in the present disclosure, the execution unit is configured to shorten a low-speed dewatering time of the intermediate dewatering process in an initial dewatering-rinsing process and the low-speed dewatering time of the intermediate dewatering process after the initial dewatering-rinsing process to be shorter than the low-speed dewatering time of the intermediate dewatering process immediately before the initial dewatering-rinsing process.

Moreover, the washing machine of the present disclosure includes a softener supply unit for supplying a softener to the washing/dewatering drum in the washing operation in which the final rinsing process is the dewatering-rinsing process.

Moreover, a washing machine of the present disclosure includes: a washing/dewatering drum, configured to accommodate washings and capable of rotating; an electric motor for driving the washing/dewatering drum to rotate; and an execution unit, configured to supply water to the washing/dewatering drum, execute drainage of the washing/dewatering drum, or control rotation of the electric motor to drive the washing/dewatering drum to rotate, and execute a washing operation consisting of a washing process, a rinsing process after the washing process and a dewatering process. The dewatering process includes a final dewatering process and an intermediate dewatering process, where the final dewatering process is executed at the end of the washing operation, and the intermediate dewatering process is at least executed immediately after the washing process. In the rinsing process of the washing operation in a water saving mode, the execution unit is configured to continuously execute a dewatering-rinsing process for a plurality of times rather than executing a water-storage rinsing process for rinsing the washings while water stored in the washing/ dewatering drum reaches a specified water level, wherein the dewatering-rinsing process comprises: a water supplying process of supplying water to the washing/dewatering drum so that the washings are saturated by water, and the intermediate dewatering process or the final dewatering process executed immediately after the water supplying process. The washing machine includes a softener supply unit configured to supply a softener to the washing/dewatering drum in the washing operation in which the final rinsing process is the dewatering-rinsing process.

Moreover, in the present disclosure, the softener supply unit is configured to supply the softener to the washing/dewatering drum in the dewatering-rinsing process immediately before the final dewatering-rinsing process.

Effects of the Disclosure

According to the present disclosure, the washing operation executed by the execution unit in the washing machine consists of the washing process, the rinsing process after the washing process and the dewatering process. The dewatering process includes the final dewatering process executed at the end of the washing operation, and the intermediate dewatering process at least executed immediately after the washing process.

The rinsing process includes the water-storage rinsing process and the dewatering-rinsing process. The water-storage rinsing process is a rinsing process of rinsing the washings while the water stored in the washing/dewatering drum reaches the specified water level. The dewatering-rinsing process includes: the water supplying process of supplying water to the washing/dewatering drum so that the washings are saturated by water, and the intermediate dewatering process or the final dewatering process executed immediately after the water supplying process.

In the rinsing process of the washing operation in the water saving mode, the execution unit executes the dewatering-rinsing process rather than the water-storage rinsing process, thereby achieving the water saving in the water saving mode compared with a case of executing the water-storage rinsing process.

The maximum rotating speed of the electric motor for rotating the washing/dewatering drum in the intermediate dewatering process immediately before the water supplying process is lower than the maximum rotating speed of the electric motor in the final dewatering process. Therefore, the washings are not compacted because of being attached to an inner surface of the washing/dewatering drum by centrifugal force at the end of intermediate dewatering process, and are in a loosened state. Thus, in the dewatering-rinsing process executed immediately after the intermediate dewatering process, the washings are easy to be saturated by water in the water supplying process. Such a dewatering-rinsing process is continuously executed for a plurality of times, thereby improving the rinsing performance of the washings.

According to the present disclosure, since the electric motor rotates at a rotating speed lower than the minimum rotating speed at which the washing/dewatering drum resonates in the water supplying process, the washings can be effectively injected with water while the washing/dewatering drum rotates at an ultra-low speed; and all the washings can be saturated by water without omission, thereby further improving the rinsing performance of the washings.

According to the present disclosure, in the water supplying process, all the washings can be saturated by water without omission by intermittently driving the washing/dewatering drum to rotate, thereby further improving the rinsing performance of the washings.

According to the present disclosure, in the water supplying process, excess water supplying beyond necessary water supplying can be inhibited by intermittently supplying water to the washing/dewatering drum, thereby achieving further water saving.

According to the present disclosure, as for the low-speed dewatering time of the intermediate dewatering process in the initial dewatering-rinsing process and the low-speed dewatering time of the intermediate dewatering process after the initial dewatering-rinsing process, generally, the washings in the washing/dewatering drum may be less biased when dewatering is normally started in the intermediate dewatering process executed immediately after washing. Therefore, for these intermediate dewatering processes, the washings can be effectively dewatered even if the low-speed dewatering time is set to be shorter than that in the intermediate dewatering process before the initial dewatering-rinsing process, thereby shortening the time for the entire washing operation.

According to the present disclosure, as for the washing operation in which the final rinsing process is the dewatering-rinsing process, softness and fragrance can be given to the washings conveniently by automatically supplying the softener to the washing/dewatering drum. It should be noted that, if the softener is supplied in the water supplying process of the dewatering-rinsing process, all the washings can be uniformly saturated by the softener through the subsequent intermediate dewatering process or the final dewatering process.

According to the present disclosure, the softener is supplied to the washing/dewatering drum in the dewatering-rinsing process immediately before the final dewatering-rinsing process. If the softener is supplied in the penultimate dewatering-rinsing process in this way, all the washings can be uniformly saturated by the softener compared with a case of supplying the softener in the final dewatering-rinsing process.

LIST OF REFERENCE NUMERALS

1: washing machine; 4: washing/dewatering drum; 6: electric motor; 30: microcomputer; and Q: washings.

DETAILED DESCRIPTION

Figure 1:
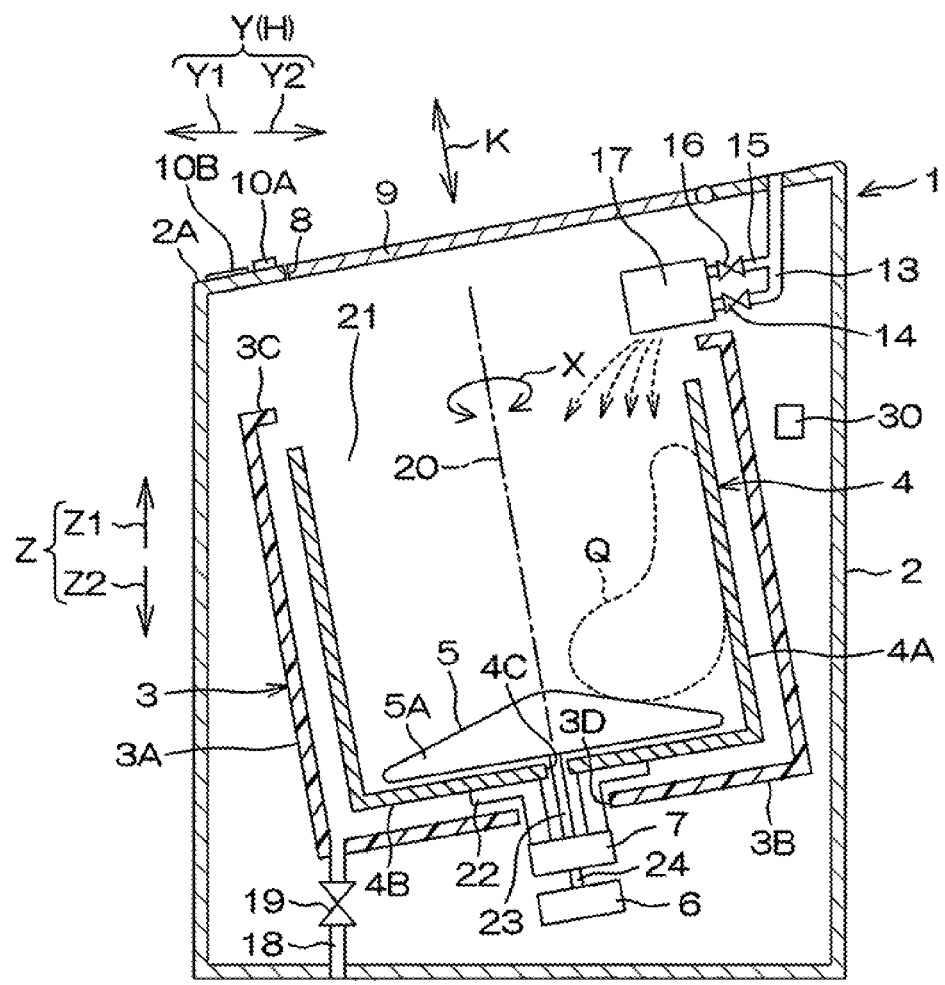
FIG. 1 is a schematic longitudinal sectional right view illustrating a washing machine according to an embodiment of the present disclosure.

Hereinafter, embodiments of the present disclosure are described in detail with reference to the drawings. FIG. 1 is a schematic longitudinal sectional right view illustrating a washing machine 1 according to an embodiment of the present disclosure. An up-down direction in FIG. 1 is referred to as an up-down direction Z of the washing machine 1. A left-right direction in FIG. 1 is referred to as a front-rear direction Y of the washing machine 1. Firstly, an outline of the washing machine 1 is described. In the up-down direction Z, an upper side is referred to as an upper side Z1 and a lower side is referred to as a lower side Z2. In the front-rear direction Y, a left side in FIG. 1 is referred to as a front side Y1 and a right side in FIG. 1 is referred to as a rear side Y2.

Although the washing machine 1 may be a washing and drying machine with a drying function, the washing machine 1 will be described by taking a washing machine without the drying function which only performs the washing operation as an example.

The washing machine 1 includes a housing 2, an outer drum 3, a washing/dewatering drum 4, a rotating wing 5, an electric motor 6 and a transmission mechanism 7.

For example, the housing 2 is formed as a box made of metal. An upper surface 2A of the housing 2 is formed to be inclined relative to a horizontal direction H with a rear end of the upper surface 2A being higher than a front end of the upper surface 2A. The upper surface 2A is formed with an opening 8 through which the interior and the exterior of the housing 2 is communicated. A door 9 for opening and closing the opening 8 is arranged on the upper surface 2A. The upper surface 2A is provided with an operation portion 10A composed of switches and the like and a display portion 10B composed of a liquid crystal panel and the like in a region closer to the front side Y1 than the opening 8. A user can freely select washing conditions and can issue instructions of operation starting, operation stopping and the like to the washing machine 1 by operating the operation portion 10A. Information relevant to the washing operation is displayed on the display portion 10B in a visible manner.

For example, the outer drum 3 is formed as a cylinder with a bottom made of resin. The outer drum 3 includes: a circumferential wall 3A which is of a substantially cylindrical shape and is configured in an inclination direction K inclining to the front side Y1 relative to the up-down direction Z; a bottom wall 3B, configured to block a hollow portion of the circumferential wall 3A from the lower side Z2; and an annular wall 3C, which is of an annular shape and is protruded to a center side of the circumferential wall 3A while trimming an end edge of an upper side Z1 of the circumferential wall 3A. The inclination direction K not only is inclined relative to the up-down direction Z, but also is inclined relative to the horizontal direction H. The hollow portion of the circumferential wall 3A is exposed from an inner side of the annular wall 3C to the upper side Z1. The bottom wall 3B is formed as a circular plate which is orthogonal to the inclination direction K and obliquely extends relative to the horizontal direction H. A through hole 3D penetrating through the bottom wall 3B is formed at the center of the bottom wall 3B.

The outer drum 3 can store water. For example, a box-shaped detergent storage chamber 17 is configured in the upper side Z1 of the outer drum 3 in the housing 2. The detergent storage chamber 17 further includes a softener storage chamber for storing a softener. The detergent storage chamber 17 is connected with a water supply path 13 connected with a faucet (not shown) from the upper side Z1 and from the rear side Y2, so that water is supplied to the outer drum 3 from the water supply path 13 through the detergent storage chamber 17. Water from the detergent storage chamber 17 can also be supplied to the outer drum 3 by spraying as shown by dotted arrows. A water supply valve 14 that can be opened and closed for starting or stopping water supply is arranged in the middle of the water supply path 13.

The detergent storage chamber 17 is further connected with a branch path 15. The branch path 15 is branched from a portion of the water supply path 13 closer to an upstream side of the faucet than the water supply valve 14. Water flows into the branch path 15 from the water supply path 13 and then is supplied to the outer drum 3 from the branch path 15 through the detergent storage chamber 17. A softener supply valve 16 that can be opened and closed for starting or stopping the water supply is arranged in the middle of the branch path 15. The interior of the detergent storage chamber 17 is divided into a first region (not shown) for storing the softener and a second region (not shown) in which no softener is stored. When the softener supply valve 16 is opened, the water flowing to the branch path 15 from the water supply path 13 passes through the first region of the detergent storage chamber 17 and is supplied to the outer drum 3. Thus, the softener in the detergent storage chamber 17 is mixed with the water and is supplied to the outer drum 3. On the other hand, when the water supply valve 14 is opened, the water directly flowing from the water supply path 13 passes through the second region of the detergent storage chamber 17 and then is supplied to the outer drum 3. In this case, water without being mixed with the softener is supplied to the outer drum 3.

The outer drum 3 is connected with a drainage path 18 from the lower side Z2. The water in the outer drum 3 is discharged out of the machine from the drainage path 18. A drain valve 19 that can be opened and closed for starting or stopping drainage is arranged in the middle of the drainage path 18.

For example, the washing/dewatering drum 4 is made of metal, and has a central axis 20 extending along the inclination direction K. The washing/dewatering drum 4 is formed as a cylinder with a bottom the diameter of which is smaller than that of the outer drum 3, and can accommodate the washings Q therein. The washing/dewatering drum 4 has a substantially cylindrical circumferential wall 4A configured along the inclination direction K and a bottom wall 4B for blocking the hollow portion of the circumferential wall 4A from the lower side Z2.

An inner circumferential surface of the circumferential wall 4A is the inner circumferential surface of the washing/dewatering drum 4. An upper end of the inner circumferential surface of the circumferential wall 4A is an inlet/outlet 21 for exposing the hollow portion of the circumferential wall 4A to the upper side Z1. The inlet/outlet 21 is opposed to an inner side region of the annular wall 3C of the outer drum 3 from the lower side Z2, and is in a state of communicating with the opening 8 of the housing 2 from the lower side Z2. Through the opening 8 which is opened and the inlet/outlet 21, the washings Q are thrown into or taken out of the washing/dewatering drum 4 by the user of the washing machine 1.

The washing/dewatering drum 4 is coaxially accommodated in the outer drum 3 and is obliquely configured relative to the up-down direction Z and the horizontal direction H. The washing/dewatering drum 4 accommodated in the outer drum 3 is capable of rotating about the central axis 20. A plurality of through holes (not shown) are formed in the circumferential wall 4A and the bottom wall 4B of the washing/dewatering drum 4. The water in the outer drum 3 can flow between the outer drum 3 and the washing/ dewatering drum 4 via the through holes. Therefore, a water level in the outer drum 3 coincides with a water level in the washing/dewatering drum 4. In addition, the water flowing out of the detergent storage chamber 17 is directly supplied to the washing/dewatering drum 4 from the upper side Z1 through the inlet/outlet 21 of the washing/dewatering drum 4.

The bottom wall 4B of the washing/dewatering drum 4 is formed as a circular plate extending substantially parallel to the bottom wall 3B of the outer drum 3 at an interval in the upper side Z1. A through hole 4C penetrating through the bottom wall 4B is formed at a center of the bottom wall 4B coinciding with the central axis 20. The bottom wall 4B is provided with a tubular supporting shaft 22 surrounding the through hole 4C and extending to the lower side Z2 along the central axis 20. The supporting shaft 22 is inserted into the through hole 3D of the bottom wall 3B of the outer drum 3. A lower end of the supporting shaft 22 is located at the lower side Z2 of the bottom wall 3B.

The rotating wing 5, i.e., an impeller, is formed as a disc shape having the central axis 20 as the center, and is configured to be concentric with the washing/dewatering drum 4 along the bottom wall 4B in the washing/dewatering drum 4. A plurality of radially configured blades 5A are arranged on the upper surface of the rotating wing 5 facing to the inlet/outlet 21 of the washing/dewatering drum 4 from the lower side Z2. A rotating shaft 23 extending from the center of the rotating wing 5 to the lower side Z2 along the central axis 20 is arranged on the rotating wing 5. The rotating shaft 23 is inserted into the hollow portion of the supporting shaft 22. The lower end of the rotating shaft 23 is at the lower side Z2 of the bottom wall 3B of the outer drum 3.

In the present embodiment, the electric motor 6 is realized by a variable frequency motor. The electric motor 6 is configured at the lower side Z2 of the outer drum 3 in the housing 2. The electric motor 6 has an output shaft 24 rotating about the central axis 20. The transmission mechanism 7 is clamped between the upper end of the output shaft 24 and the lower ends of the supporting shaft 22 and the rotating shaft 23. The transmission mechanism 7 selectively transfers the driving force output from the output shaft 24 by the electric motor 6 to one or both of the supporting shaft 22 and the rotating shaft 23. A well-known transmission mechanism can be used as the transmission mechanism 7.

The washing/dewatering drum 4 and the rotating wing 5 rotate about the central axis 20 when the driving force from the electric motor 6 is transferred to the supporting shaft 22 and the rotating shaft 23. Rotating directions of the washing/dewatering drum 4 and the rotating wing 5 coincide with a circumferential direction X of the washing/dewatering drum 4.

Figure 2:
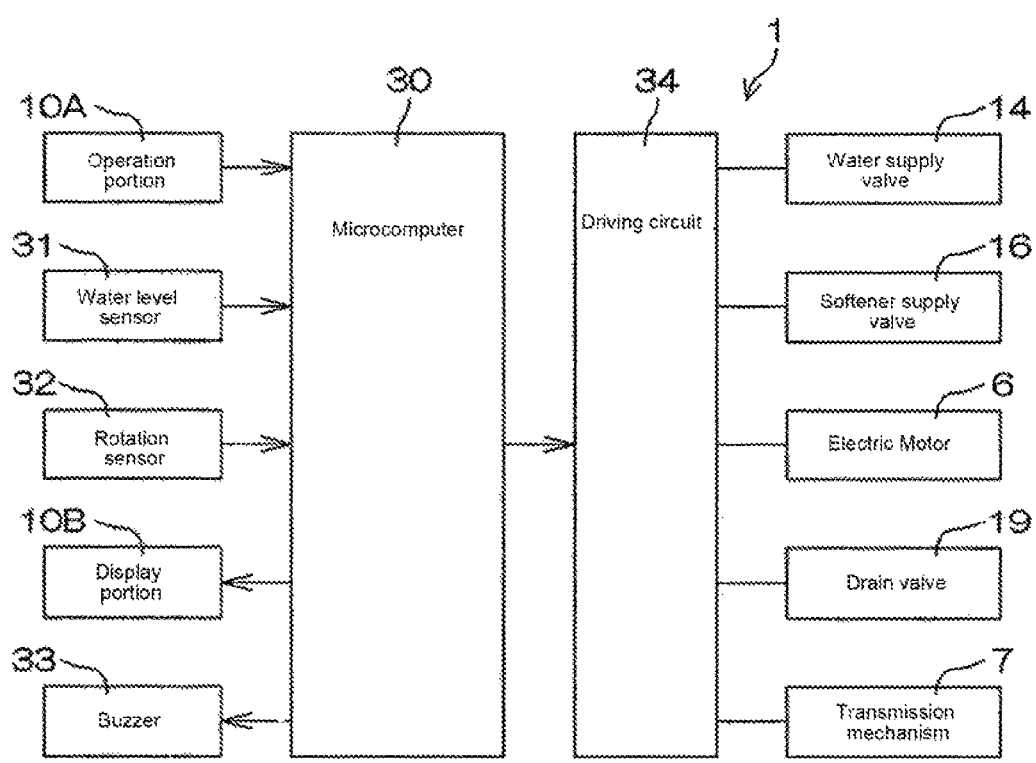
FIG. 2 is a block diagram illustrating an electrical configuration of a washing machine.

FIG. 2 is a block diagram illustrating an electrical configuration of the washing machine 1. Referring to FIG. 2, the washing machine 1 includes a microcomputer 30 served as an execution unit and a softener supply unit. For example, the microcomputer 30 is composed of a CPU, an ROM, an RAM and the like, and is configured in the housing 2 (referring to FIG. 1).

The washing machine 1 further includes a water level sensor 31, a rotation sensor 32 and a buzzer 33. The water level sensor 31, the rotation sensor 32 and the buzzer 33 as well as the operation portion 10A and the display portion 10B described above are electrically connected with the microcomputer 30, respectively. The electric motor 6, the transmission mechanism 7, the water supply valve 14, the softener supply valve 16 and the drain valve 19 are electrically connected with the microcomputer 30 through a driving circuit 34 respectively.

The water level sensor 31 is configured to detect water levels of the outer drum 3 and the washing/dewatering drum 4. Detection results of the water level sensor 31 are input to the microcomputer 30 in real time.

The rotation sensor 32 is configured to read the rotating speed of the electric motor 6, more specifically the rotating speed of the output shaft 24 of the motor 6, and is composed of, for example, a plurality of Hall ICs (not shown). The rotating speed read by the rotation sensor 32 is input to the microcomputer 30 in real time. The microcomputer 30 controls a duty ratio of a voltage supplied to the electric motor 6 according to the input rotating speed, so as to control the electric motor 6 to rotate at a desired rotating speed. In the present embodiment, the rotating speed of the electric motor 6 is the same as that of the washing/dewatering drum 4.

As described above, when the user operates the operation portion 10A to select the washing conditions of the washings Q and the like, the microcomputer 30 receives the selection. The microcomputer 30 displays the desired information to the user through the display portion 10B in the visible manner. The microcomputer 30 informs the user of the start, the end and the like of the washing operation by a specified sound emitted from the buzzer 33.

The transmission mechanism 7 is controlled by the microcomputer 30 to switch a transferring destination of the driving force of the electric motor 6 to one or both of the supporting shaft 22 and the rotating shaft 23. The microcomputer 30 controls the opening and closing of the water supply valve 14, the softener supply valve 16 and the drain valve 19. Thus, through the microcomputer 30, water can be supplied to the washing/dewatering drum 4 by opening the water supply valve 14, the softener can be supplied to the washing/dewatering drum 4 by opening the softener supply valve 16, and the drainage of the washing/dewatering drum 4 can be performed by opening the drain valve 19.

Next, the washing operation performed by the microcomputer 30 in the washing machine 1 will be described with reference to the flow charts of FIG. 3A and FIG. 3B. The washing operation includes a standard mode shown in FIG. 3A and a water saving mode shown in FIG. 3B. In addition, the washing operation consists of a washing process of washing the washings Q, a rinsing process of rinsing the washings Q after the washing process, and a dewatering process of dewatering the washings Q. The dewatering process includes a final dewatering process performed at the end of the washing operation, and an intermediate dewatering process at least performed immediately after the washing process. It should be noted that the user can only use tap water and can also use bath water as needed in the washing operation.

Figure 3A:
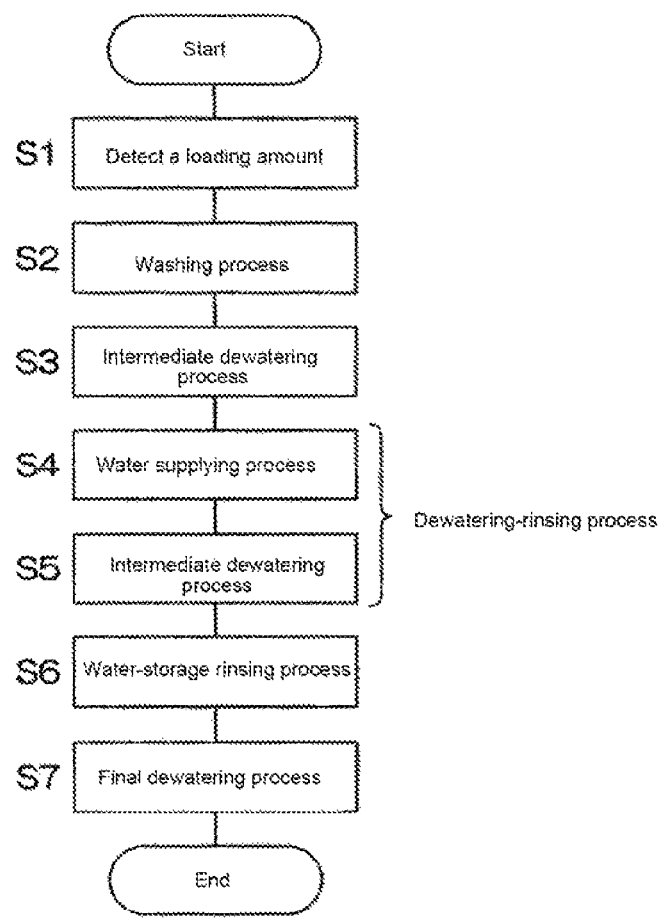
FIG. 3A is a flow chart illustrating a control action in a washing operation in a standard mode.

Firstly, the washing operation in the standard mode of FIG. 3A is described. The microcomputer 30 detects the quantity of the washings Q in the washing/dewatering drum 4 as a loading amount as the washing operation starts (step S1). Specifically, the microcomputer 30 detects the loading amount based on fluctuation of the rotating speed of the electric motor 6 when the washing/dewatering drum 4 is stably rotated at a low rotating speed. In response to the detected loading amount, the microcomputer 30 displays a duration of the washing operation, the required quantity of the detergent, and the like on the display portion 10B.

Next, the microcomputer 30 executes the washing process (step S2). In the washing process, the microcomputer 30 controls the water supply valve 14 to be opened in the state that the drain valve 19 is closed, and water is supplied to the washing/dewatering drum 4. When the water stored in the washing/dewatering drum 4 reaches a specified water level, the microcomputer 30 controls the water supply valve 14 to be closed so as to stop supplying water, and drives the electric motor 6 at a specified time to drive the washing/dewatering drum 4 and the rotating wing 5 to rotate. The washings Q in the washing/dewatering drum 4 are stirred by the rotating washing/dewatering drum 4 and the blades 5A of the rotating wing 5, and are washed by decomposing dirt via the detergent fed into the washing/dewatering drum 4. Then, the microcomputer 30 stops driving the electric motor 6 and controls the drain valve 19 to be opened. Thus, the water stored in the washing/dewatering drum 4 is discharged out of the machine from the drainage path 18 of the outer drum 3. It should be noted that, at a stage that the washing process is ended, water dissolved with the detergent is in a state of permeating into the washings Q as the detergent water.

The microcomputer 30 executes the intermediate dewatering process immediately after the washing process (step S3). In the intermediate dewatering process, the microcomputer 30 controls the drain valve 19 to maintain the state of being opened, and drives the electric motor 6 at a specified time so that the washing/dewatering drum 4 and the rotating wing 5 rotate integrally. Through the rotation of the washing/dewatering drum 4 and the rotating wing 5, a centrifugal force acts on the washings Q in the washing/dewatering drum 4, so that the washings Q are dewatered. The water exuding from the washings Q through dewatering is discharged out of the machine from the drainage path 18 of the outer drum 3.

The intermediate dewatering process is described in detail. The microcomputer 30 controls the electric motor 6 to stably rotate at a low rotating speed of 120 rpm after the electric motor 6 is accelerated from 0 rpm to a so-called first rotating speed of 120 rpm. The first rotating speed is higher than a rotating speed (for example, 50 rpm to 60 rpm) at which the washing/dewatering drum 4 undergoes transverse resonance, and is lower than a rotating speed (for example, 200 rpm to 220 rpm) at which the washing/dewatering drum 4 undergoes longitudinal resonance. After the stable rotation at 120 rpm, the microcomputer 30 controls the electric motor 6 to stably rotate at a low rotating speed of 240 rpm after the electric motor 6 is accelerated from 120 rpm to a so-called second rotating speed of 240 rpm. The second rotating speed is higher than the rotating speed at which the longitudinal resonance occurred. Then, the microcomputer 30 controls the electric motor 6 to stably rotate at a high rotating speed of 800 rpm after the electric motor 6 is accelerated from 240 rpm to 800 rpm.

In other words, in the intermediate dewatering process, the microcomputer 30 controls the electric motor 6 to accelerate through three stages, including a first acceleration stage in which the rotation of the electric motor 6 is accelerated from 0 rpm to 120 rpm, a second acceleration stage in which the rotation of the electric motor 6 is accelerated from 120 rpm to 240 rpm and a third acceleration stage in which the rotation of the electric motor 6 is accelerated from 240 rpm to 800 rpm. Unlike such a case, when the electric motor 6 is directly accelerated from 0 rpm to 800 rpm, a large amount of water is exuded from the washings Q at a time. As a result, hidden dangers that a drainage state of the drainage path 18 gets worse, or the drainage path 18 is filled with bubbles may exist. However, in the present embodiment, the electric motor 6 is accelerated at stages to prevent a large amount of water from being exuded from the washings Q at a time, thereby preventing such a bad condition. At the end of the intermediate dewatering process, the microcomputer 30 controls the drain valve 19 to be closed after controlling the electric motor 6 to stop rotating through braking. The braking herein can be achieved in the following manners: the microcomputer 30 controls the duty ratio to rapidly stop the rotation of the electric motor 6, or a brake device (not shown) is arranged additionally and is operated by the microcomputer 30 to rapidly stop the rotation of the electric motor 6.

The microcomputer 30 executes a water supplying process immediately after the intermediate dewatering process (step S4). In the water supplying process, the microcomputer 30 causes the washing/dewatering drum 4 to intermittently rotate at an ultra-low speed by controlling the electric motor 6 to switch to "operating" for driving and to switch to "stopping" for stopping alternately and repeatedly. Specifically, the rotating speed of the electric motor 6 changes in a manner of increasing from 0 rpm to 30 rpm and decreasing from 30 rpm to 0 rpm alternately and repeatedly.

30 rpm herein is an example. In a word, the rotating speed of the electric motor 6 in the water supplying process is just required to be lower than the minimum rotating speed at which the washing/dewatering drum 4 resonates. Although the minimum rotating speed is different based on the size of the washing/dewatering drum 4, the rotating speed at which the washing/dewatering drum 4 undergoes the transverse resonance is 50 rpm to 60 rpm in the present embodiment.

In addition, in the water supplying process, the microcomputer 30 controls the water supply valve 14 to be opened by being switched to "opening" and to be closed by being switched to "closing" alternately and repeatedly, so that water is supplied to the washing/dewatering drum 4 intermittently. The time when the water supply valve 14 is opened/closed coincides with the time when the operation of the electric motor 6 is stopped. Therefore, the water supply valve 14 is also "opened" when the electric motor 6 operates, and the water supply valve 14 is also "closed" when the electric motor 6 stops. In the water supplying process, since intermittent rotation and intermittent water supplying of the washing/dewatering drum 4 are performed at the same time, the water is splashed to the washings Q in the washing/dewatering drum 4 from the water supply path 13 when the washing/dewatering drum 4 is rotated at the ultra-low speed. At this time, the water from the water supply path 13 is supplied to the washings Q in a manner of dome of water. Such manner of supplying water like dome of water is called "splashing water supplying". In the water supplying process, a small amount of water is supplied to the washing/dewatering drum 4 so that the washings Q are saturate. Accordingly, almost no water is stored in the washing/dewatering drum 4.

The microcomputer 30 further executes the intermediate dewatering process the same as that in step S3 immediately after the water supplying process (step S5). By the intermediate dewatering process herein, the washings Q in the washing/dewatering drum 4 are centrifugally dewatered, thereby throwing out and removing the detergent water permeating to the washings Q together with the water supplied in the water supplying process.

The water supplying process in step S4 and the following intermediate dewatering process in step S5 after the water supplying process constitute a dewatering-rinsing process. The dewatering-rinsing process is one type of rinsing processes. It should be noted that in the dewatering-rinsing process, although the washing/dewatering drum 4 rotates, the rotating wing 5 is in a stationary state.

The microcomputer 30 executes a water-storage rinsing process immediately after the dewatering-rinsing process (step S6). The water-storage rinsing process is one type of rinsing processes. In the water-storage rinsing process, the microcomputer 30 controls the water supply valve 14 to be opened to supply water to the washing/dewatering drum 4 in the state that the drain valve 19 is closed. When water stored in the washing/dewatering drum 4 reaches to, for example, a specified water level at which the washings Q are closer to the lower side Z2 than the water surface, the microcomputer 30 controls the water supply valve 14 to be closed and stops supplying water.

Next, the electric motor 6 is driven by the microcomputer 30 at specified time while water stored in the washing/dewatering drum 4 reaches the specified water level, so as to drive the rotating wing 5 to rotate. In such a water-storage rinsing process, the washings Q in the washing/dewatering drum 4 are soaked in the water, and stirred by the blades 5A of the rotating wing 5 so as to be rinsed. Then, the microcomputer 30 stops the driving of the electric motor 6, and controls the drain valve 19 to be opened. Thus, the water stored in the washing/dewatering drum 4 is discharged out of the machine from the drainage path 18 of the outer drum 3. At the end of the water-storage rinsing process, the washings Q are completely rinsed, and almost no detergent component exists in the washings Q.

The microcomputer 30 executes the final dewatering process immediately after the water-storage rinsing process (step S7). In the final dewatering process, the microcomputer 30 controls the drain valve 19 to maintain being opened, and drives the electric motor 6 at specified time so that the washing/dewatering drum 4 and the rotating wing 5 rotate integrally. Although the final dewatering process is substantially the same as the intermediate dewatering processes in step S3 and step S5, in the final dewatering process, the electric motor 6 stably rotates at 800 rpm for a time longer than that in the intermediate dewatering process after the third acceleration stage. In the final dewatering process, the microcomputer 30 controls the electric motor 6 to accelerate at three stages including the first acceleration stage, the second acceleration stage and the third acceleration stage. Thus, since a centrifugal force is applied to the washings Q in the washing/dewatering drum 4, the washings Q are formally dewatered. The water exuding from the washings Q by dewatering is discharged out of the machine from the drainage path 18 of the outer drum 3. The final dewatering process is ended. So far the washing operation in the standard mode is ended.

As described above, the microcomputer 30 executes the washing operation by supplying water to the washing/dewatering drum 4, or performing drainage of the washing/dewatering drum 4 or controlling the rotation of the electric motor 6 to rotate the washing/dewatering drum 4.

Figure 3B:
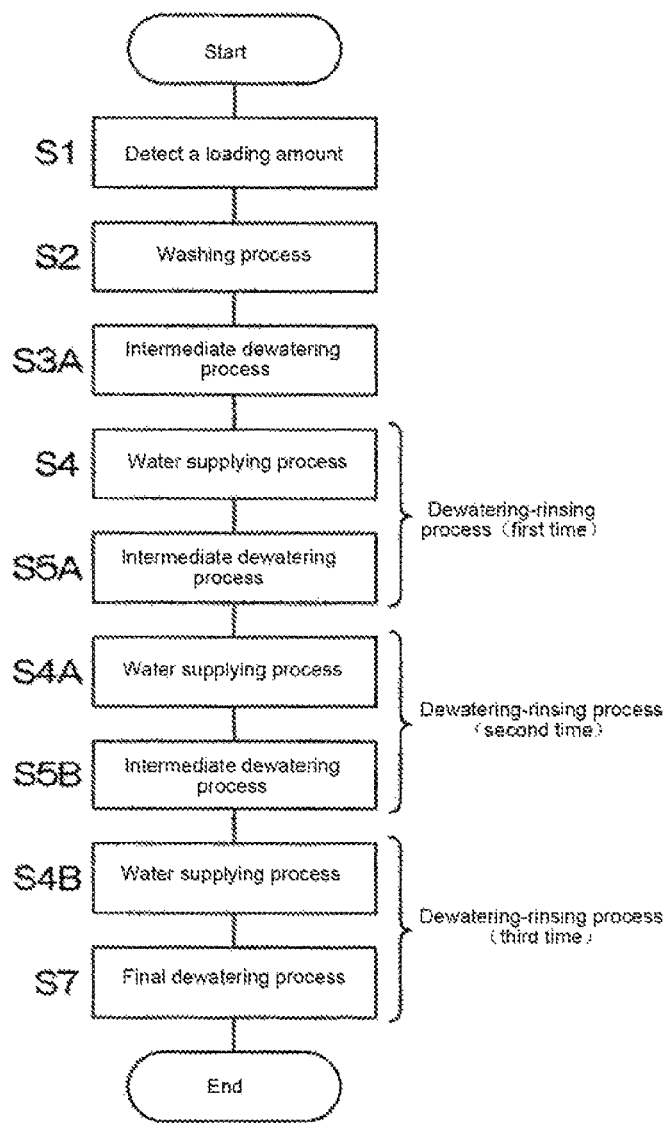
FIG. 3B is a flow chart illustrating a control action in a washing operation in a water saving mode.
Figure 4:
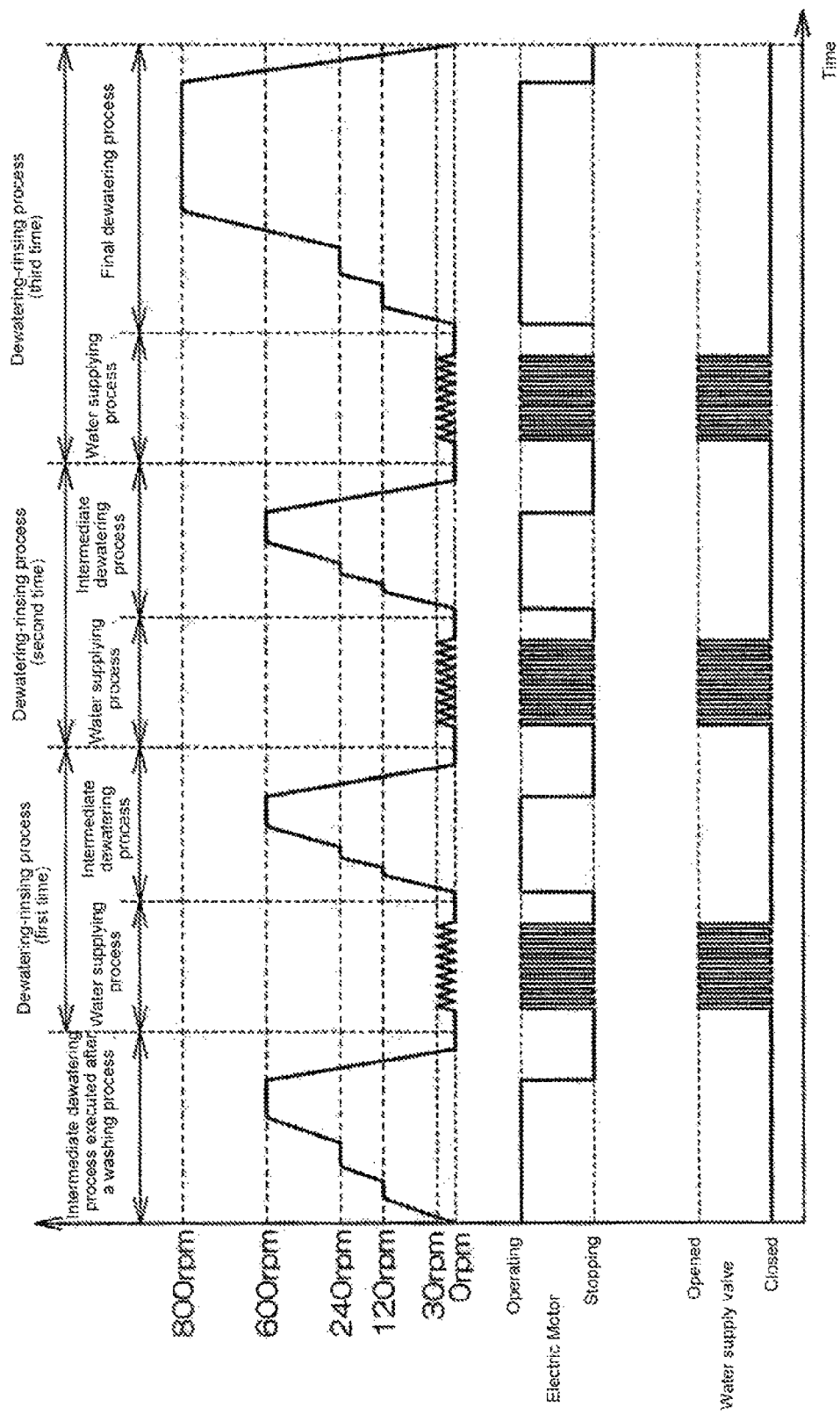
FIG. 4 is a timing diagram illustrating a rotating speed of an electric motor, an operating/stopping state of the electric motor and an opened/closed state of a water supply valve.

Next, the washing operation in the water saving mode of FIG. 3B is described. It should be noted that, in all figures including FIG. 3B, the same step numbers are given to the processing steps same as the processing steps in the other figures, and detailed descriptions of the processing steps are omitted. In addition, the sequence chart of FIG. 4 is also referred when describing the washing operation in the water saving mode. In the sequence chart of FIG. 4, a horizontal axis represents the elapsed time, and a vertical axis represents the rotating speed (unit: rpm) of the electric motor 6, the operating/stopping state of the electric motor 6, and the opened/closed state of the water supply valve 14 in the order from top to bottom.

The microcomputer 30 detects the loading amount of the washings Q as the washing operation in the water saving mode starts (step S1), and then executes the washing process (step S2) and the intermediate dewatering process (step S3A) in sequence. Similar to the intermediate dewatering process in the standard mode (step S3), in the intermediate dewatering process in the water saving mode, the microcomputer 30 controls the electric motor 6 to accelerate in three stages. However, the rotation of the electric motor 6 is merely accelerated from 240 rpm to 600 rpm in the third acceleration stage, which is different from the standard mode. Thus, after the third acceleration stage, the microcomputer 30 controls the electric motor 6 to stably rotate at a medium rotating speed of 600 rpm. Except that the rotation of the electric motor 6 is accelerated from 240 rpm to 600 rpm in the third acceleration stage, the intermediate dewatering process in the water saving mode is the same as the intermediate dewatering process in the standard mode.

After the intermediate dewatering process of step S3A, as a first dewatering-rinsing process, the microcomputer 30 executes a water supplying process (step S4) and an intermediate dewatering process (step S5A) substantially same as that in step S3A in sequence. After the first dewatering-rinsing process, as a second dewatering-rinsing process, the microcomputer 30 executes a water supplying process (step S4A) similar to that in step S4 and an intermediate dewatering process (step S5B) similar to that in step S5A in sequence.

However, in the water saving mode, the low-speed dewatering time of the intermediate dewatering process (step S5A) in the initial dewatering-rinsing process and the low-speed dewatering time of the intermediate dewatering process (step S5B) after the initial dewatering-rinsing process is controlled by the microcomputer 30 to be shorter than the low-speed dewatering time of the intermediate dewatering process (step S3A) before the initial dewatering-rinsing process. Specifically, the rotation time of the electric motor 6 from 0 rpm to 600 rpm, i.e., the low-speed dewatering time, in each of the second dewatering process (step S5A) and the third intermediate dewatering process (step S5B) is shorter than the low-speed dewatering time in the first intermediate dewatering process (step S3A) (referring to FIG. 4).

In general, in the case that the dewatering is normally started in the intermediate dewatering process executed immediately after the washing process, since the washings Q are uniformly dispersed in the washing/dewatering drum 4 in the water supplying process of the initial dewatering-rinsing process, compared with the first intermediate dewatering process, the washings Q in the washing/dewatering drum 4 are less biased with the second intermediate dewatering process and the third intermediate dewatering process. Thus, as for the second intermediate dewatering process and the third intermediate dewatering process, even if the low-speed dewatering time when the dewatering is started is shortened compared with the first intermediate dewatering process, the rotating speed of the electric motor 6 is successfully increased so that the washings Q can be effectively dewatered. As a result, the time for the entire washing operation can be shortened.

Next, after the second dewatering-rinsing process, as a third dewatering-rinsing process, the microcomputer 30 executes a water supplying process (step S4B) similar to that in step S4 and a final dewatering process (step S7) following the water supplying process in sequence. The final dewatering process constituting the third dewatering-rinsing process ends. So far the washing operation in the water saving mode ends.

As described above, as the rinsing process of the washing operation in the water saving mode, the microcomputer 30 continuously executes the dewatering-rinsing process for a plurality of times (steps S4 to S7) rather than executing the water-storage rinsing process. Therefore, compared with the standard mode in which the water-storage rinsing process (step S6) is executed, the water conservation can be realized in the water saving mode. Even if the dewatering-rinsing process is executed for a plurality of times, the total quantity of water used for rinsing in one washing operation is greatly reduced compared with the case in which the water-storage rinsing process is executed.

Moreover, as shown in FIG. 4, the maximum rotating speed (600 rpm herein) of the electric motor 6 in the intermediate dewatering process (steps S3A, S5A and S5B) immediately before the water supplying process during each dewatering-rinsing process is lower than the maximum rotating speed (800 rpm herein) of the electric motor 6 in the final dewatering process (step S7), and is about 75% of the maximum rotating speed of the final dewatering process.

Figure 5:
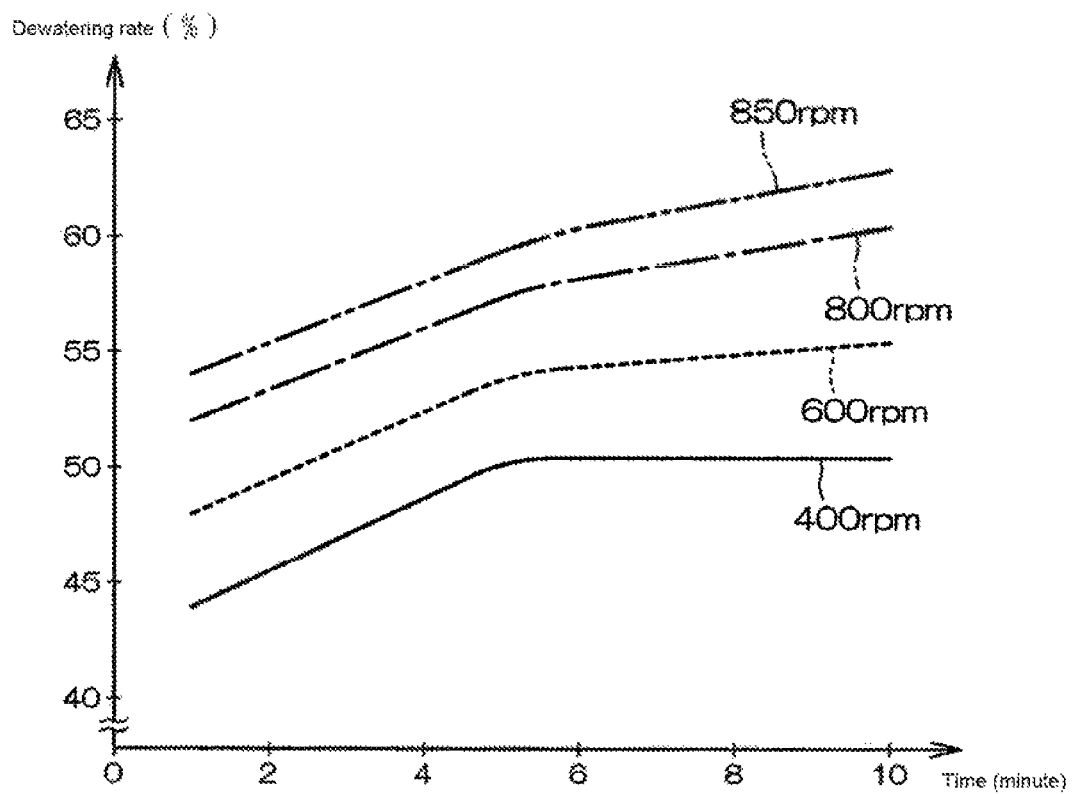
FIG. 5 is a diagram illustrating a relationship between time and a dewatering rate of washings in a dewatering process.

FIG. 5 is a diagram illustrating a relationship between the time and a dewatering rate of washings in the dewatering process. In the chart of FIG. 5, the horizontal axis represents the elapsed time (unit: minute), and the longitudinal axis represents the dewatering rate over time in the dewatering process. The dewatering rate refers to an index value indicating how much water is exuded as compared with the initial stage of the dewatering process. The higher the dewatering rate is, the less the water contained in the washings Q is, but the washings Q may also become compacted because of attaching to the inner surface of the washing/dewatering drum 4 through the centrifugal force generated by the rotation of the washing/dewatering drum 4 in the dewatering process.

It is known from FIG. 5 that if the rotating speed of the electric motor 6 is up to 800 rpm and 850 rpm, the dewatering rate may be above 60%. However, in this case, the washings Q are further spread up and down to the inlet/outlet 21 side in the washing/dewatering drum 4, besides being compacted. Thus, the washings Q are hard to be saturated with water in the subsequent water supplying process of the dewatering-rinsing process, and it is difficult to spray water to the portion of the inlet/outlet 21 side where the washings Q are located. In order to loosen the washings Q compacted in this way and saturate the washings Q with water, a large amount of water is required in the rinsing process, so that it is difficult to achieve water saving.

On the other hand, when the maximum rotating speed of the electric motor 6 in the intermediate dewatering process immediately before the water supplying process is 600 rpm lower than the maximum rotating speed of 800 rpm in the final dewatering process, the dewatering rate at the end of the intermediate dewatering process is 55% or less. The washings Q at this time are not compacted because of being attached to the inner surface of the washing/dewatering drum 4 due to the centrifugal force, and are not spread to the inlet/outlet 21 side, but are in a soft state of being loosened. Thus, water is easy to be sprayed on the washings Q and saturate the washings Q in the water supplying process of the dewatering-rinsing process performed immediately after the intermediate dewatering process. In addition, such a dewatering-rinsing process is continuously executed for a plurality of times. Therefore, the rinsing performance of the washings Q can be improved to perform the same rinsing performance as the standard mode. It should be noted that when the rotating speed of the electric motor 6 is too low, the dewatering performance that should be presented in the intermediate dewatering process cannot be obtained. Therefore, the rotating speed of the electric motor 6 is better to be about 300~700 rpm, preferably about 400~600 rpm.

In addition, in the water supplying process (steps S4, S4A and S4B), as described above, by rotating the electric motor 6 at the rotating speed of 30 rpm lower than the minimum rotating speed, the washings Q can be effectively saturated in the water while the washing/dewatering drum 4 rotates at an ultra-low speed. In addition, the water can all the washings Q can be saturated by water by intermittently rotating the washing/dewatering drum 4. Thus, the rinsing performance of the washings Q can be further improved. On the other hand, in the water supplying process, since water is intermittently supplied to the washing/dewatering drum 4, excess water supplying beyond necessary water supplying can be inhibited, thereby achieving further water saving.

Figure 6:
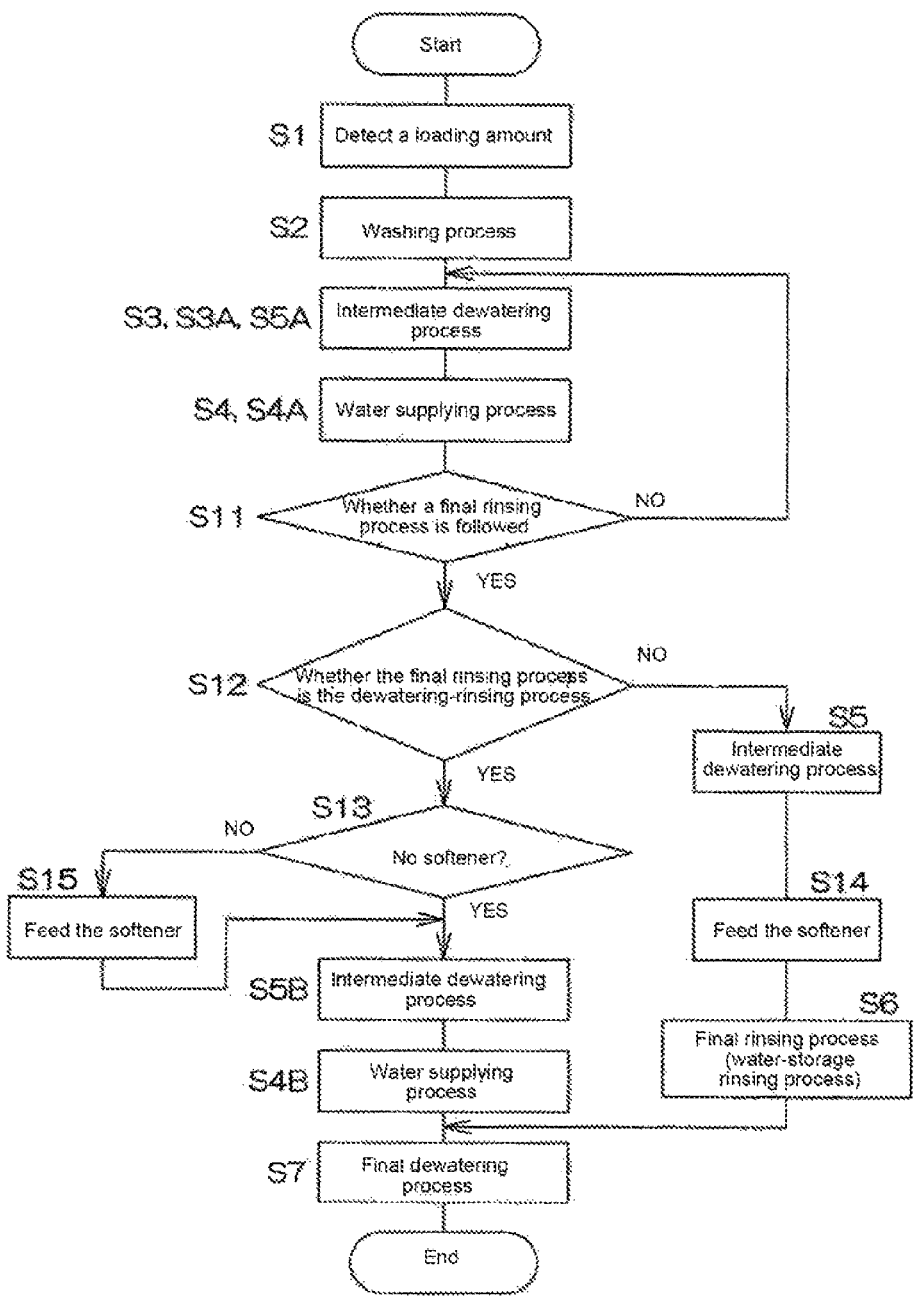
FIG. 6 is a flow chart illustrating a control action in a washing operation.

FIG. 6 is a flow chart illustrating a control operation in the washing operation, in which a process relevant to the softener is added. The washing operation in the standard mode is set as follows by default: the softener is always fed in the final water-storage rinsing process. On the other hand, in the washing operation in the water saving mode, the user operates the operation portion 10A to select whether to feed the softener in advance. In this case, if it is selected to feed the softener, a form of "feeding softener" is stored in the microcomputer 30; and if it is selected not to feed the softener, a form of "no softener" is stored in the microcomputer 30. It should be noted that the washing operation in the water saving mode can also be set as "feeding softener" by default, and the user operates the operation portion 10A to change from "feeding softener" to "no softener".

In the case of the washing operation in the standard mode, as the washing operation starts, the microcomputer 30 detects the loading amount of the washings Q (step S1), and then executes the washing process (step S2) and the intermediate dewatering process (step S3) in sequence. Next, the microcomputer 30 confirms whether the current rinsing process is followed by the final rinsing process (step S11) after executing the water supplying process (step S4) constituting the dewatering-rinsing process.

In the case of the standard mode, the first dewatering-rinsing process is followed by the water-storage rinsing process of the final rinsing process (step S11: YES) rather than the dewatering-rinsing process (step S12: NO). Therefore, the microcomputer 30 controls the softener supply valve 16 to be opened to feed the softener to the washing/dewatering drum 4 (step S14) after executing the intermediate dewatering process (step S5) constituting remaining work of the previous dewatering-rinsing process. Next, the microcomputer 30 executes the final rinsing process, i.e., the water-storage rinsing process (step S6). In the water-storage rinsing process, the softener penetrates the washings Q, thereby giving the softness and fragrance to the washings Q. The microcomputer 30 executes the final dewatering process (step S7) after the water-storage rinsing process.

In the case of the washing operation in the water saving mode, as the washing operation starts, the microcomputer 30 detects the loading amount of the washings Q (step S1), and then executes the washing process (step S2) and the intermediate dewatering process (step S3A) in sequence. Next, the microcomputer 30 executes the water supplying process (step S4) constituting the first dewatering-rinsing process.

In the case of the water saving mode, the current rinsing process is followed by the second dewatering-rinsing process, rather than the final rinsing process (step S11: NO). Therefore, the microcomputer 30 executes the water supplying process constituting the second dewatering-rinsing process (step S4A) after executing the intermediate dewatering process (step S5A) constituting the remaining work of the previous first dewatering-rinsing process. The second dewatering-rinsing process is followed by the final rinsing process (step S11: YES), and then is followed by the third dewatering-rinsing process (step S12: YES).

If "no softener" is selected in advance (step S13: YES), the microcomputer 30 executes the intermediate dewatering process of the second dewatering-rinsing process without feeding the softener to the washing/dewatering drum 4 (step S5B). At this time, the water supply for feeding the softener can be omitted, so that the water saving can be achieved.

On the other hand, if "feeding softener" is selected (step S13: NO), the microcomputer 30 controls the softener supply valve 16 to be opened, feeds the softener to the washing/dewatering drum 4 (step S15), and executes the intermediate dewatering process constituting the remaining work of the second dewatering-rinsing process (step S5B). In other words, the microcomputer 30 controls to supply the softener to the washing/dewatering drum 4 not only in the washing operation in the standard mode in which the final rinsing process is the water-storage rinsing process, but also in the washing operation in the water saving mode in which the final rinsing process is the dewatering-rinsing process.

In this way, in the water saving mode, the softness and fragrance can also be given to the washings Q conveniently by automatically supplying the softener to the washing/dewatering drum 4. However, relative to the case that the softener is supplied immediately before the water-storage rinsing process in the standard mode, in the case of the water saving mode, the microcomputer 30 controls to supply the softener to the washing/dewatering drum 4 in the second dewatering-rinsing process immediately before the final dewatering-rinsing process. In addition, in the case of the water saving mode, the softener is simultaneously supplied in the water supplying process of the second dewatering-rinsing process and during the splashing water supplying (step S15), so that the softener can be effectively mixed with the washings Q by rotating the washing/dewatering drum 4 at the ultra-low speed, thereby inhibiting dissolution residues of the softener.

Next, as the third dewatering-rinsing process, the microcomputer 30 executes the water supplying process (step S4B) and the final dewatering process (step S7). The softener can be uniformly permeated to the entire washings Q through the water supplying process of the second dewatering-rinsing process, i.e., the water supplying process of the penultimate dewatering-rinsing process, compared with the case that the softener is supplied in the final dewatering-rinsing process.

Moreover, in the case that the softener is supplied to the washing/dewatering drum 4 in the second dewatering-rinsing process immediately before the final dewatering-rinsing process, the softener can be uniformly permeated to the entire washings Q through the intermediate dewatering process (step S5B) after the water supplying process of the second dewatering-rinsing process, the water supplying process (step S4B) after the intermediate dewatering process, and the final dewatering process (step S7). In this case, in the intermediate dewatering process of step S5B, in order to more uniformly permeate the softener to the entire washings Q, the motor 6 is preferably rotated at the maximum rotating speed (such as 400 rpm) lower than the rotating speed in the intermediate dewatering process in the case of "no softener".

The present disclosure is not limited to the above-described embodiments, and can be changed within the scope of claims.

For example, in the above-described embodiments, although the dewatering-rinsing process is executed for three times in the water saving mode, the number of times of the dewatering-rinsing processes can be changed arbitrarily. As long as the rinsing performance in the dewatering-rinsing process is sufficient, the dewatering-rinsing process can also be executed only twice. In order to improve the rinsing performance, the dewatering-rinsing process can also be executed for more than four times.

In addition, besides the normal operation and the water saving mode described above, the washing operation in a time shortening mode can also be set. In the rinsing process in the time shortening mode, the water-storage rinsing process is not executed, and the dewatering-rinsing process is executed only once. Thus, besides water saving, the time shortening can also be realized. In the time shortening mode, in order to maintain the rinsing performance at the same degree as the other modes, the time of the splashing water supplying of the water supplying process in the dewatering-rinsing process is set to be longer than that in the other modes, and the rotating speed of the motor 6 in the dewatering process performed immediately after the water supplying process is set to be higher than that in the other modes.

Moreover, in the washing machine 1, although the central axis 20 of the outer drum 3 and the washing/dewatering drum 4 is configured to extend along the inclination direction K, the central axis 20 can also be configured to extend along the up-down direction Z.

What is claimed is:
1. A washing machine, comprising:
a washing/dewatering drum, configured to accommodate washings and capable of rotating;
an electric motor for driving the washing/dewatering drum to rotate; and
an execution unit, configured to supply water to the washing/dewatering drum, execute drainage of the washing/dewatering drum, and control rotation of the electric motor to drive the washing/dewatering drum to rotate, and execute a washing operation consisting of a washing process, a rinsing process after the washing process and a dewatering process, wherein
the dewatering process comprises a final dewatering process and an intermediate dewatering process, wherein the final dewatering process is executed at the end of the washing operation, and the intermediate dewatering process is at least executed immediately after the washing process;
in the rinsing process of the washing operation in a water saving mode, the execution unit is configured to continuously execute a dewatering-rinsing process for a plurality of times rather than executing a water-storage rinsing process for rinsing the washings while water stored in the washing/dewatering drum reaches a specified water level, wherein the dewatering-rinsing process comprises: a water supplying process of supplying water to the washing/dewatering drum so that the washings are saturated by water, and the intermediate dewatering process or the final dewatering process executed immediately after the water supplying process; and a maximum rotating speed of the electric motor in the intermediate dewatering process immediately before the water supplying process is lower than a maximum rotating speed of the electric motor in the final dewatering process;

wherein the execution unit is configured to drive the washing/dewatering drum to rotate intermittently in the water supplying process, and configured to intermittently supply water to the washing/dewatering drum in the water supplying process.

2. The washing machine according to claim 1, wherein
the execution unit is configured to drive the washing/dewatering drum to rotate in the water supplying process; and the rotating speed of the electric motor in the water supplying process is lower than a minimum rotating speed at which the washing/dewatering drum resonates.

3. The washing machine according to claim 2, wherein the execution unit is configured to shorten a low-speed dewatering time of the intermediate dewatering process in an initial dewatering-rinsing process and the low-speed dewatering time of the intermediate dewatering process after the initial dewatering-rinsing process to be shorter than the low-speed dewatering time of the intermediate dewatering process immediately before the initial dewatering-rinsing process.

4. The washing machine according to claim 2, further comprising a softener supply unit, wherein the softener supply unit is configured to supply a softener to the washing/dewatering drum in the washing operation in which the final rinsing process is the dewatering-rinsing process.

5. The washing machine according to claim 1, wherein the execution unit is configured to shorten a low-speed dewatering time of the intermediate dewatering process in an initial dewatering-rinsing process and the low-speed dewatering time of the intermediate dewatering process after the initial dewatering-rinsing process to be shorter than the low-speed dewatering time of the intermediate dewatering process immediately before the initial dewatering-rinsing process.

6. The washing machine according to claim 5, further comprising a softener supply unit, wherein the softener supply unit is configured to supply a softener to the washing/dewatering drum in the washing operation in which the final rinsing process is the dewatering-rinsing process.

7. The washing machine according to claim 1, further comprising a softener supply unit, wherein the softener supply unit is configured to supply a softener to the washing/dewatering drum in the washing operation in which the final rinsing process is the dewatering-rinsing process.

8. The washing machine according to claim 7, wherein the softener supply unit is configured to supply the softener to the washing/dewatering drum in the dewatering-rinsing process immediately before the final dewatering-rinsing.

9. A washing machine, comprising:
a washing/dewatering drum, configured to accommodate washings and capable of rotating;
an electric motor for driving the washing/dewatering drum to rotate; and
an execution unit, configured to supply water to the washing/dewatering drum, execute drainage of the washing/dewatering drum, or control rotation of the electric motor to drive the washing/dewatering drum to rotate, and execute a washing operation consisting of a washing process, a rinsing process after the washing process and a dewatering process, wherein the dewatering process comprises a final dewatering process and an intermediate dewatering process, wherein the final dewatering process is executed at the end of the washing operation, and the intermediate dewatering process is at least executed immediately after the washing process;

in the rinsing process of the washing operation in a water saving mode, the execution unit is configured to continuously execute a dewatering-rinsing process for a plurality of times rather than executing a water-storage rinsing process for rinsing the washings while water stored in the washing/dewatering drum reaches a specified water level, wherein the dewatering-rinsing process comprises: a water supplying process of supplying water to the washing/dewatering drum so that the washings are saturated by water, and the intermediate dewatering process or the final dewatering process executed immediately after the water supplying process; and the washing machine comprises a softener supply unit configured to supply a softener to the washing/dewatering drum in the washing operation in which the final rinsing process is the dewatering-rinsing process;

wherein the execution unit is configured to drive the washing/dewatering drum to rotate intermittently in the water supplying process, and configured to intermittently supply water to the washing/dewatering drum in the water supplying process.

10. The washing machine according to claim 9, wherein the softener supply unit is configured to supply the softener to the washing/dewatering drum in the dewatering-rinsing process immediately before the final dewatering-rinsing.

* * * * *